United States Patent
Sawdon et al.

(10) Patent No.: US 6,710,019 B1
(45) Date of Patent: Mar. 23, 2004

(54) WELLBORE FLUID

(76) Inventors: Christopher Alan Sawdon, 6, Southview Road, Biscovey, Par, Cornwall, PL24 2HJ (GB); David Antony Ballard, 6, William Mackie Ave., Stonehaven, Scotland, AB39 2PQ (GB)

(*) Notice: Subject to any disclaimer, the term of this patent is extended or adjusted under 35 U.S.C. 154(b) by 0 days.

(21) Appl. No.: 09/762,035
(22) PCT Filed: Jul. 16, 1999
(86) PCT No.: PCT/EP99/05329
§ 371 (c)(1), (2), (4) Date: Jun. 1, 2001
(87) PCT Pub. No.: WO00/06664
PCT Pub. Date: Feb. 10, 2000

(30) Foreign Application Priority Data

Jul. 30, 1998 (GB) .............................. 9816479

(51) Int. Cl.$^7$ .................................. C09K 7/00
(52) U.S. Cl. ............ 507/136; 507/261; 507/110; 507/124; 507/209; 507/211; 507/230; 507/922; 507/925; 166/294; 166/295; 166/175; 166/72
(58) Field of Search ............... 507/136, 261, 507/110, 124, 209, 211, 230, 922, 925; 175/72; 166/294, 295

(56) References Cited

U.S. PATENT DOCUMENTS

| | | | |
|---|---|---|---|
| 4,048,435 A | | 9/1977 | Rutenberg et al. |
| 4,098,997 A | * | 7/1978 | Tessler ........................ 536/106 |
| 4,385,155 A | * | 5/1983 | Michaels ..................... 507/124 |
| 4,411,800 A | * | 10/1983 | Green et al. ................. 507/114 |
| 4,424,302 A | * | 1/1984 | Block et al. ................. 507/124 |
| 4,472,552 A | * | 9/1984 | Blouin ........................ 507/124 |
| 4,473,480 A | * | 9/1984 | Green et al. ................. 507/114 |
| 4,474,667 A | * | 10/1984 | Block ......................... 507/114 |
| 4,618,434 A | * | 10/1986 | Blouin ........................ 507/124 |
| 4,796,700 A | * | 1/1989 | Sandiford ................... 507/124 |
| 5,948,733 A | * | 9/1999 | Cawiezel et al. ........... 507/212 |

* cited by examiner

*Primary Examiner*—Philip C. Tucker
(74) *Attorney, Agent, or Firm*—Howrey Simon Arnold & White LLP

(57) ABSTRACT

The present invention relates to a wellbore fluid comprising a particulate material composed of the reaction product of A) one or more water soluble organic compound having possessing a molecular weight of less than 30,000 and possessing at least two hydroxyl groups and B) any other organic compound(s) capable of forming acetal or hemiacetal crosslinks with the hydroxyl groups of compound A. The invention relates also to the specific particulate material itself and to applications of the wellbore fluid of the invention for well processes such as drilling, under-reaming, completing, working over, sealing loss zones, sealing fractures, sealing cavities or other very high permeability conduits in a rock formation, or hydraulic fracturing to stimulate a hydrocarbon-producing zone.

8 Claims, 2 Drawing Sheets

WELLBORE FLUID

This invention relates to wellbore fluids suitable for use in oil and gas exploration and production industries and embraces the fluids used for drilling, under-reaming, completion, cementing, fracturing, stimulation, workover and packing of wellbores and also includes spacer fluids whose function is to separate two fluids during pumping operations and spotting fluids whose function is to treat certain intervals of the wellbore.

In the process of rotary drilling a well, a drilling fluid or mud is being circulated down the rotating drill pipe, through the bit, and up the annular space between the pipe and the formation or steel casing, to the surface. The drilling fluid performs different functions such as removal of drilled cuttings from the bottom of the hole to the surface, suspension of cuttings and weighting material when circulation is interrupted, control of subsurface pressures, maintaining the integrity of the wellbore until the well section is cased and cemented, isolate the fluids from the formation by providing sufficient filtration control to prevent excessive loss of fluids to the formation, cool and lubricate the drill string and bit, maximise penetration rate etc.

The required functions can be achieved by a wide range of fluids composed of various combination of solids, liquids and gases and classified according to the constitution of the continuous phase mainly in two groupings: aqueous (water-based) drilling fluids, and non-aqueous (mineral oil or synthetic-base) drilling fluids, commonly 'oil-base fluids'

Other types of fluid used in well operations include completion fluids, a term which commonly refers to fluids pumped after drilling finishes but prior to starting production, and workover fluids, used in remedial operations usually on a well that is already producing.

Figure 1:
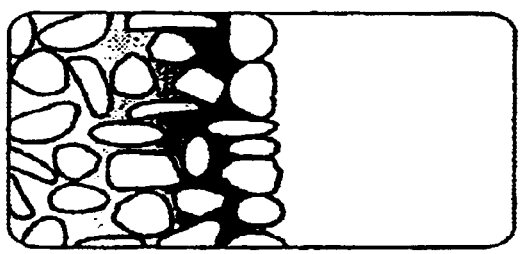
FIG. 1 is a cartoon drawing of the build-up of a low permeability internal filtercake comprised of solid phases present in a wellbore fluid.

During the operations for drilling and completing hydrocarbon-bearing formations (reservoirs), an overbalance pressure is often applied which causes fluid loss from the wellbore into the reservoir rock. This filtration process causes solid particles to block pores in the formation with the build-up of a low permeability internal filtercake comprised of the solid phases present in the fluid as shown FIG. 1. The depth of invasion may be from a few millimeters to (occasionally) many centimeters. This is the primary cause of damage (loss of productivity) in open hole wells, a phenomenon which is increased by a large overbalance pressure. Furthermore the formation of a thick filter cake may lead to an increased risk of getting drill pipes or measuring tools stuck in the wellbore and to failure in cementing the wellbore casings.

Figure 2:
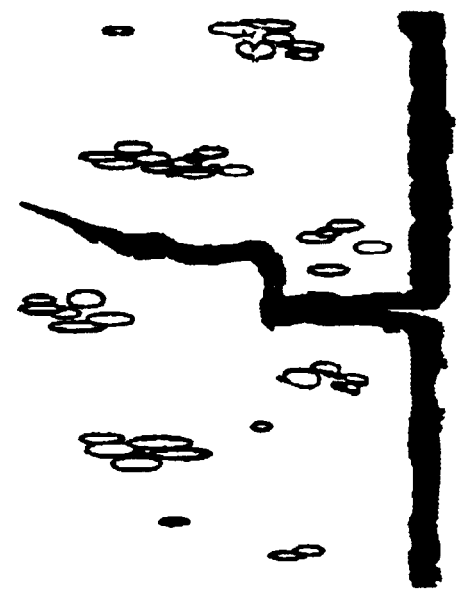
FIG. 2, is a cartoon drawing of mud solid invasion of a large natural fracture in a subterranean formation.

Mud solid invasion is also important when the well comprises large natural fractures as shown FIG. 2. The fractures invaded by the mud are no longer available to drain the oil into the wellbore. In workover operations, perforations may be also invaded in the same way.

It is therefore highly desirable to provide means to at least minimise formation damage.

High fluid loss, especially spurt loss, tends to increase mud invasion. Accordingly, additives of a polymeric type such as bioploymers (Xanthan, Scleroglucan), starches and celluloses (hydroxyethyl cellulose[HEC], polyanionic cellulose [PAC])—are added to provide viscosity and fluid loss control.

Usually wellbore fluids also contain inorganic solids such as clays, barite and calcium carbonate. When considering minimising mud invasion, an important aspect in selecting such inorganic solids is their particle size distribution for the particles to seal the entrance to pores or fractures in the reservoir rock. The "bridging" solids are combined with water soluble or colloidal polymers to enhance the seal.

Figure 3:
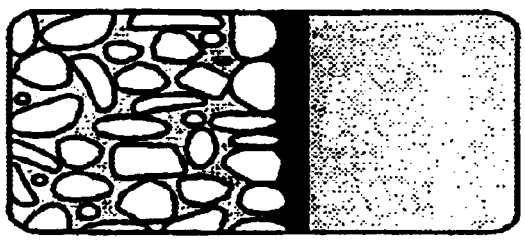
FIG. 3, is a cartoon drawing of the build-up of the limited depth of invasion of a filtercake comprised of sized solid particles present in a wellbore fluid.
Figure 4:
FIG. 4, is a cartoon drawing of the limited depth of invasion of a large natural fracture in a subterranean formation from a filtercake comprised of sized solid particles.

Sized particles limit the depth of invasion as shown FIGS. 3 and 4 where the pore or fracture entrance is sealed with bridging solids. The solids used include for instance ground silica (especially common in fracturing operations), mica, calcium carbonate, ground salts and oil soluble resins.

Another often interrelated approach is to use soluble solids to allow subsequent clean-up with wash fluids. Accordingly sized calcium carbonate (that can be dissolved by acid and therefore be removed from the pores) is a typical component of drill-in fluids. The polymers used in conjunction with the calcium carbonate are often selected on the basis that they can also be broken down by acid or enzyme treatments to prevent them impairing the permeability of the formation.

However, these remedial treatments involving the use of strong acid (for instance 15% HCl) have a high cost and can be indeed hazardous and ineffective for the following reasons. Poor dissolution of the filter cake can be caused by zones of higher permeability channeling acid away and into the formation. This can lead to further formation damage. Strong acids involve health and safety issues and cause corrosion of sand screens and downhole equipment. Treating a wellbore interval also raises placement issues. Moreover, laboratory tests have shown that the acids can be damaging to the reservoir rock matrix.

Because of these limitations there are many systems and products on the market to try and improve the performance of filter cake clean up treatments. However, these to have associated problems. For example, the use of alkaline oxidising agents can lead to problems of iron oxide scale in metal tubulars. Enzymes take a long time to react and are limited in application by temperature, pH, and salinity. Internal breakers, such as magnesium peroxide, can be added to the reservoir drill-in fluid so it forms part of the filter cake. This is then activated by acid to produce hydrogen peroxide to facilitate the breakdown the polymers in the cake. Unfortunately, this can actually happen in the reservoir drill in fluid whilst drilling which can have a negative effect on fluid properties.

The present invention aims at providing new wellbore fluids which can form an easy-to-remove filter cake.

The invention provides a fluid system that, when used for the purposes of drilling, completing, cementing, stimulating, packing or working over a wellbore, will facilitate filter cake removal. These can be aqueous or non-aqueous based fluids (such as hydrocarbon based fluids). The result will be reduced or often negligible impairment of permeability of the producing formation by the relevant reservoir servicing fluid compared with well servicing fluids containing conventional bridging materials.

In accordance with the present invention, acetal crosslinked polymers are used as the bridging agent in the relevant fluid. In essence the bridging material is made of a particulate material which may swell but is substantially insoluble in water under non-acidic conditions (at pH>7.5) and which is degraded at acidic pH (below 6.5) to substantially solids-free or soluble decomposition products. The particles are composed of the reaction product of A) one or more water soluble organic compound having possessing a molecular weight of less than 30,000 and possessing at least two hydroxyl groups and B) any other organic compound(s) capable of forming acetal or hemiacetal cross-links with the hydroxyl groups of compound A.

Examples of compounds A with free hydroxyl groups capable of entering into the crosslink reaction of the invention include monosaccharides, oligosaccharides, polysaccharides of molecular weight less than 30,000, glycerol, polyglycerols, erythritol, pentaerythritol, mannitol, sorbitol, glycols, polyalkylene glycols, and low molecular weight water soluble vinyl polymers possessing hydroxyl groups.

Suitable acetal crosslink agents B include aliphatic monoaldehydes and dialdehydes having from 2 to 10 carbon atoms and esters of propiolic acid wherein the alcohol forming the ester has from 1 to 8 carbons. A preferred compound is 1,5 pentanedial (glutaric dialdehyde) $C_5H_8O_2$.

Usually, the amount of cross-linking agent varies from 0.5 to 15% w/w (and the amount of compound A accordingly varies from 99.5 to 85% w/w).

An example of a useful material has been prepared from 95% yellow dextrin (a gum produced from the acid hydrolisis and depolymerisation of starch feedstock) and 5% by weight pentanedial.

Acetal crosslinked starches are known from U.S. Pat. Nos. 4,048,435 and 4,098,997 that describe methods of preparing reversibly crosslinked granular starches for use in the paper, adhesives and textile industries but with no mention as to their potential use in the oil industry. It is stated that these starches contain acetal crosslinkages, which are stable under neutral or alkaline conditions but which readily hydrolyse under acidic conditions, and they are designed to dissolve and form a colloidal suspension in water. By contrast, the present invention contemplates the cross-linking of much lower molecular weight polyols than the above mentioned starches to produce a particulate suspension where the particles do not dissolve or disperse at alkaline pH.

The solid may be ground or prepared to any desired particle size.

The particles are stable under alkaline conditions and insoluble (but usually swell) in aqueous wellbore fluids of pH 7.5 and above. Thus they provide very effective sealing of the formation by virtue of the swollen particles' ability to deform to "fit" the pore openings or fractures.

Most advantageously however, the cross links rapidly hydrolyse under acidic catalysed conditions, under even weakly acidic conditions at pH 6.5 and below. The degradation products are essentially solids free water soluble moieties of low molecular weight and low viscosity in solution. Hence any flow restriction (of hydrocarbons) caused by the particles may be efficiently removed. A low pH solution such as a weak easily-handled acid of little corrosion potential may be pumped in place to catalytically degrade the particles. Alternatively, produced fluids, be they oil and water or gas and water, usually exhibit an aqueous pH of less than pH 6.5 due to the carbon dioxide commonly present. Hence the removal of the temporary seal may be triggered simply by allowing the well to flow. As the seal degrades the well flow increases autocatalytically.

The hydrolysis does not consume the acid. Hence much enhanced clean up and optimised well productivity is anticipated compared to that exhibited when using current materials such as ground calcium carbonate.

The following features and benefits have been identified with the use of acetal crosslinked, polymeric, bridging solids:

Filter cakes made from these novel materials almost totally degrade in the presence of weak acid giving almost 4× the return flow rate compared to a corresponding calcium carbonate based fluid under the same conditions. This also gives the benefits of better health and security from handling weak acids and less corrosion of downhole screens and equipment.

A feature of the invention is that the degradation of the acetal bridging material is acid catalysed, as opposed to the conventional stoichiometric reaction. This means the acid is not consumed or neutralised in the reaction. The benefit of this is an enhanced acid treatment as the acid is available to go on degrading more filter cake.

Due to the high mobility of the hydrogen ion, (which can therefore penetrate the water-swollen particles) the acid does not have to be forced into the filter cake to break it down. Which means that less acid induced damage results from strong acid being forced into the formation causing fines to migrate, bridge and restrict production.

Acetal crosslinked bridging materials can degrade under simulated well flowing conditions in the laboratory, where the weak acid is provided by produced $CO_2$ forming carbonic acid in the aqueous phase. This could negate the need for a costly wash fluid treatment.

Acetal bridging materials have a low density. A low density will enable a wider range of applications to be covered, density constraints often limit the amount of bridging solid which can be used. Calcium carbonate has a density of 2.7 S.G. and cannot always be added at the desired concentrations for bridging in low density fluids. Another benefit will be improved removal of undesirable, non acidisable, contaminating solids, from the fluid. Contaminating solids from the formation have roughly the same density as calcium carbonate which makes separation difficult in a conventional fluid. However, these solids are approximately 2.7 times denser than the acetal bridging solid. This means that highly efficient separation techniques, such as centrifugation, can be employed to remove non acidisable solids from the fluid without removing the acetal bridging solids. This therefore makes the fluid less formation damaging.

Preparation of an acetal bridging solid.

95 weight parts of dry yellow dextrin was dissolved in water and 5 weight parts pentanedial added. The sample was mixed and heated to 130° C. The water was then removed under partial vacuum over a 16 hour period. The solid from this was then ground to a fine particle size (substantially all less than 150 microns) and tested as follows.

The wellbore fluids in the following examples have been tested using a high pressure/high temperature fluid loss cell as schematically represented FIG. 5. Such an apparatus typically comprises a measuring cell 1 closed by an upper cover provided with a central passage 2 and a bottom provided with a drain 3. The bottom is covered with a base made of a porous material, in this instance a 5 micron aloxite disc. Gas can be injected to provide the differential pressure between the mud and the formation fluids. The product doses are expressed in pounds per barrel (ppb).

EXAMPLE 1

A fluid system of this invention (Acetal fluid) was compared to one of conventional formulation, $CaCO_3$ based fluid (comparison fluid) containing 49 ppb calcium carbonate bridging solids, 6 ppb DUALFLO filtration control additive, 1 ppb IDVIS viscosifier and suspending agent, 25 ppb $CaCl_2$, 2 ppb PTS200 alkaline buffer.

The Acetal fluid contains—40 ppb ACETAL bridging solids, 6 ppb DUALFLO, 1 ppb IDVIS, 43 ppb KCl, 2 ppb PTS200.

Figure 5:
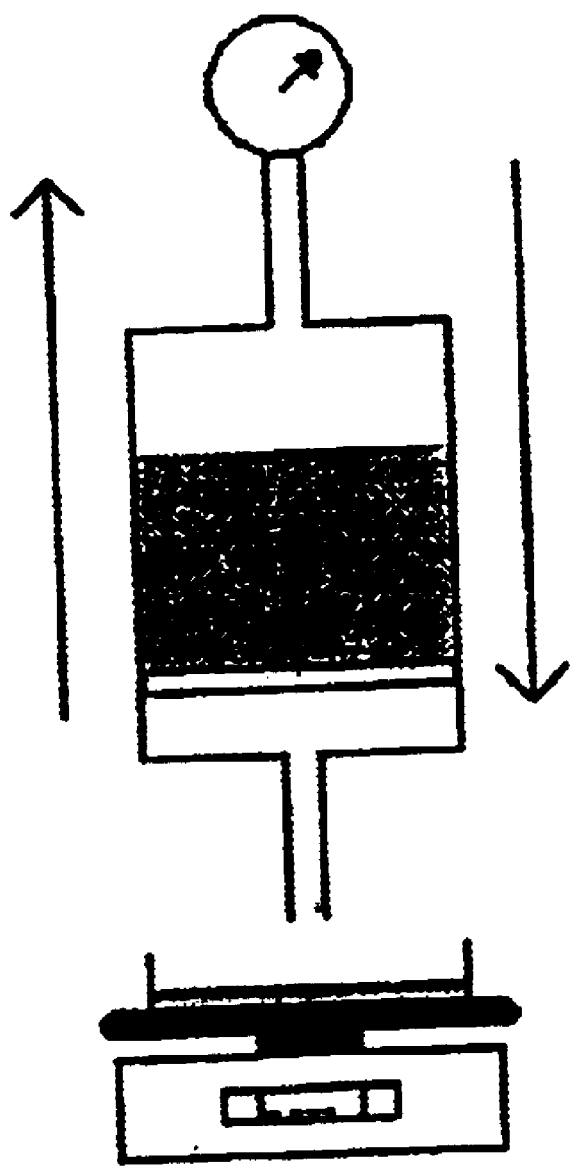
FIG. 5 is a schematic drawing of a high pressure/high temperature fluid loss cell.

The testing of the fluids was according to the following protocol, schematically illustrated FIG. 5 where the arrows indicate the direction of the fluid flow in the core plugs (the upwards arrow corresponds to fluid loss from the subterranean rock to the wellbore while the downwards arrow characterises fluid loss from the wellbore into the subterranean rock).

Step 1: 'apply' mud damage, using the tested wellbore fluid, to a 5 micron aloxite disc under typical well conditions (temperature 80° C., pressure of 500 psi). Fluid loss is measured after 15.5 hours (downwards arrow). A filter cake is formed on the aloxite disc.

Step 2: cell emptied hot and refilled with 10% NaCl brine and 12/20 sand. A 45 micron aperture screen was then placed on the sand. The sand is used for modelling a gravel pack which may be placed in a well to control sand production.

Step 3: simulates the flow from the reservoir oil into the wellbore through the filter cake (upwards arrow), using kerosene flow back and a typical formation pressure of 4 psi with carbon dioxide as the pressuring gas at 80° C.

Step 4: Flow 500 g of $CO_2$ containing kerosene, shut the cell and leave for 64 hours at 80° C. and then test the flow rate in the production direction

| Sample | 15.5 hr. Fluid loss (ml) | Flow rate after shut in (g/min) |
| --- | --- | --- |
| $CaCO_3$ bridging solids | 17 | 22.2 |
| Acetal bridging solids | 20 | 33.6 |

The example illustrates the effect that an ACETAL fluid filter cake is degraded in the presence kerosene containing dissolved carbon dioxide. The return flow rate for the ACETAL fluid was 1.5 × higher than for the $CaCO_3$ fluid. This test suggests that naturally occurring fluids from a production zone will degrade the filter cake even in the absence of applied acid. It can also be seen that using all acetal bridging solids gives a slightly higher fluid loss. It was found that the use of a small amount of calcium carbonate in conjunction with the acetal solids reduced the filtrate loss, allowing a lower concentration of DUALFLO fluid loss additive to be utilised in the following examples.

EXAMPLE 2

The $CaCO_3$ based fluid contains—40 ppb calcium carbonate, 6 ppb DUALFLO, 1 ppb IDVIS, 43 ppb KCl, 1 ppb PTS100.

The ACETAL based fluid contains—7 ppb calcium carbonate, 30 ppb ACETAL solids, 3 ppb DUALFLO, 1 ppb IDVIS, 43 ppb KCl, 3 ppb PTS100.

The following test protocol is used

Step 1: 'apply' mud damage, using the tested wellbore fluid, through a 5 micron aloxite disc at a temperature of 80° C. and a pressure of 500 psi. The fluid loss is measured after 15.5 hours.

Step 2: cell emptied hot and refilled with 100 ml 5% citric acid as a moderated acidic wash fluid.

Step 3: Reseal cell, do not pressurise, leave 72 hours at 80° C.

Step 4: Open cell and fill with 12–20 sand and fit 45 micron aperture screen

Step 5: Carry out kerosene return flows at 4 psi, at a temperature of 80° C.

| Sample | 16.5 hr. Fluid loss (ml) | Flow rate (g/min) | pH of produced fluids |
| --- | --- | --- | --- |
| $CaCO_3$ fluid | 23 | 21.2 | 5.9 |
| ACETAL fluid | 17 | 80.9 | 2.0 |

The example signifies that under mild acid conditions the return flow rate for the ACETAL fluid was nearly 4× higher than for the $CaCO_3$ fluid, indicating that the ACETAL fluid filter cake has degraded to a much greater extent. This was confirmed on opening the cell which showed the presence of a large filter cake for the $CaCO_3$ fluid and little to no filter cake for the ACETAL fluid. The lower pH of the produced fluids from the cell containing the ACETAL filter cake indicates that the acid is not being used up to the same extent as with $CaCO_3$ filter cake. The example also demonstrates that the filter cake is degraded without pressurisation of the cell. Conventionally, these tests are typically carried out under pressure to force acid into the cake.

EXAMPLE 3

The $CaCO_3$ based fluid contains—40 ppb calcium carbonate, 6 ppb DUALFLO, 1 ppb IDVIS, 43 ppb KCl, 2 ppb PTS200, 15 ppb OCMA clay.

The ACETAL based fluid contains—7 ppb calcium carbonate, 30 ppb ACETAL solids, 3 ppb DUALFLO, 1 ppb IDVIS, 43 ppb KCl, 3 ppb PTS100 15 ppb OCMA clay.

The test protocol of example 2 was used except that step 1 lasted only 15.5 hours and step 3 20 hours.

| Sample | 15.5 hr. Fluid loss (ml) | Flow rate (g/min) |
| --- | --- | --- |
| $CaCO_3$ fluid | 32 | 9.8 |
| ACETAL fluid | 18.8 | 21.4 |

The example demonstrates that an ACETAL fluid filter cake containing non acidisable OCMA clay is degraded by weak acid in a short time. The return flow rate for the ACETAL fluid was 2.2× higher than for the $CaCO_3$ fluid, indicating that the ACETAL fluid filter cake has degraded to a much greater extent.

EXAMPLE 4

The $CaCO_3$ based fluid contains—40 ppb calcium carbonate, 6 ppb DUALFLO, 1 ppb IDVIS, 43 ppb KCl, 2 ppb PTS200.

The ACETAL based fluid contains—10 ppb calcium carbonate, 30 ppb ACETAL solids, 3 ppb DUALFLO, 1 ppb IDVIS, 43 ppb KCl, 2 ppb PTS200.

The following test protocol was used:

Step 1: 'apply' mud damage, using the tested wellbore fluid, through a 5 micron aloxite disc at a temperature of 80° C. and a pressure of 500 psi. The fluid loss is measured after 15.5 hours.

Step 2: cell emptied hot and refilled with 0.1 m (0.37% w/v) HCl and 12/20 sand and a 45 micron aperture screen fitted.

Step 3: The cell was resealed and left for 4 hours @ 80° C.

Step 4: then kerosene flow backs carried out at 4 psi and 80° C.

| Sample | 15.5 hr. Fluid loss (ml) | Flow rate (g/min) |
|---|---|---|
| $CaCO_3$ fluid | 29 | 20.7 |
| ACETAL fluid | 16 | 32.0 |

The example demonstrates that exposure of ACETAL fluid filter cake to even a highly diluted acid causes it to degrade in only a short time. The return flow rate for the ACETAL fluid was 1.5× higher than for the $CaCO_3$ fluid.

What is claimed is:

1. A wellbore fluid comprising a substantially water non-soluble particulate material that is degradable under acidic conditions and composed of the reaction product of A) one or more water soluble organic compound having a molecular weight of less than 30,000 and possessing at least two hydroxyl groups and B) any other organic compound(s) capable of forming acetal or hemiacetal cross-links with the hydroxyl groups of compound A.

2. The wellbore fluid of claim 1 wherein hydroxyl compound (A) is selected from the the group consisting: monosaccharides, oligosaccharides, polysaccharides of molecular weight less than 30,000, glycerol, polyglycerols, erythritol, pentaerythritol, mannitol, sorbitol, glycols, polyalkylene glycols, and low molecular weight water soluble vinyl polymers possessing hydroxyl groups.

3. The wellbore fluid according to claim 1 or 2, wherein compound (B) is selected from the the group consisting of: aliphatic aldehydes and dialdehydes having from 2 to 10 carbon atoms, and esters of propiolic acid wherein the alcohol forming the ester has from 1 to 8 carbon atoms.

4. The wellbore fluid of claim 1, wherein 0.5–15%, dry weight of compound (B) and 95.5–85% of said compound (A) is reacted.

5. The wellbore fluid according to claim 1 wherein the substantially water non-soluble particulate material is the reaction product of dextrin and pentanedial.

6. A process of drilling, under-reaming, completing, working over, sealing loss zones, sealing fractures, sealing cavities or other very high permeability conduits in a rock formation, or hydraulic fracturing to stimulate a hydrocarbon-producing zone comprising using a wellbore fluid including a substantially water non-soluble particulate material that is degradable under acidic conditions and composed of the reaction product of A) one or more water soluble organic compound having a molecular weight of less than 30,000 and possessing at least two hydroxyl groups and B) any other organic compound(s) capable of forming acetal or hemiacetal cross-links with the hydroxyl groups of compound A.

7. The process of claim 6 further comprising pumping a low pH fluid containing any acid or buffered solution of less than pH 6.0 into the producing zone segment of the wellbore to catalyse the decomposition of the particulate material of this invention.

8. The process of claims 6 or 7, further comprising allowing the well to flow, causing a drop in pH, which catalyses the decomposition of the substantially water non-soluble particulate material, permitting increased flow of produced fluids.

* * * * *